United States Patent [19]
Varley

[11] 4,111,075
[45] Sep. 5, 1978

[54] GRINDING MACHINE

[75] Inventor: Bernard Scott Varley, Sabden, Near Blackburn, England

[73] Assignee: Automatic Grinding Machine & Engineering Co. Ltd., England

[21] Appl. No.: 692,715

[22] Filed: Jun. 4, 1976

[30] Foreign Application Priority Data

Oct. 25, 1975 [GB] United Kingdom ............... 43523/75

[51] Int. Cl.² ............................................. B23D 63/14
[52] U.S. Cl. .................................... 76/41; 51/216 ND
[58] Field of Search .................. 76/37, 40, 41, 43, 77; 51/216 ND

[56] References Cited

U.S. PATENT DOCUMENTS

| | | | |
|---|---|---|---|
| 3,066,552 | 12/1962 | Gavin | 76/40 |
| 3,952,616 | 4/1976 | Yarley | 76/40 |

FOREIGN PATENT DOCUMENTS

479,855  4/1953  Italy ............................................ 76/40

*Primary Examiner*—Harold D. Whitehead
*Assistant Examiner*—Roscoe V. Parker
*Attorney, Agent, or Firm*—John C. Smith, Jr.

[57] ABSTRACT

A grinding machine is disclosed for supporting a circular saw for rotation about its own axis. The grinding machine includes a cyclically controlled clamp for successively clamping and releasing the saw; a cyclically controlled indexing arrangement for indexing the saw; a cyclically controlled grinding wheel for moving into and out of operative position and a control mechanism arranged so that the clamp is released to allow the indexing arrangement to index the saw but applied during movement of the grinding wheel through the operative position.

9 Claims, 3 Drawing Figures

GRINDING MACHINE

This invention relates to grinding apparatus which is particularly intended for grinding circular saw blades, disc type milling cutters and the like, although the invention is not restricted to any particular use. For convenience however the invention will be described in relation to the grinding of circular saw blades.

A conventional grinding machine for sharpening a woodworking tool such as, for example, a circular saw blade usually comprises a power driven grinding wheel which is rotated in a fixed plane and in a fixed position relatively to the machines base, and a worktable which is adapted to hold the saw blade at various angles relatively to the plane of rotation of the grinding wheel. In addition, it is necessary for the workpiece table to be capable of moving the saw blade towards and away from the grinding wheel at various angles to the grinding wheel's cutting surface whilst the saw blade is held at a selected one of several angles relatively to the plane of rotation. It is therefore necessary, in order to carry out the sharpening of a circular saw blade, to provide a conventional grinding machine with a relatively complex worktable arrangement, and it has also been found that the sharpening operation on such a machine is a time consuming and therefore expensive operation.

In the specification of U.S. Pat. No. 3,952,616 there is described a grinding machine primarily intended for sharpening circular saw blades, and comprising a base, a workpiece support, and a grinding wheel assembly having a grinding wheel rotatably mounted thereon, wherein the grinding wheel assembly is mounted on the base so that the plane of rotation of the grinding wheel relatively to the workpiece support is capable of pivotal adjustment about a first and a second axis, and the grinding wheel is pivotable about a third axis for arcuate movement in a direction which is parallel to or included within a plane containing at least part of the cutting surface of the grinding wheel.

It is the object of the present invention to provide a grinding machine which is adapted to carry out automatic grinding of a plurality of teeth on a rotary saw or the like once it has been set up for a particular set of saw teeth.

According to this invention a grinding machine comprises means for supporting a circular saw or the like for rotation about its own axis; cyclically controlled clamping means for successively clamping and releasing a saw mounted on the machine at least in a zone of the saw adjacent to a grinding position; cyclically controlled indexing means for a saw or the like mounted on the machine; a cyclically controlled grinding wheel mounting adapted to move into and out of an operative position, and control means arranged so that the clamping means is released to allow the indexing means to index the saw but applied during movement of the grinding wheel mounting through the operative position.

Preferably the indexing means includes a finger adapted to engage in a space between two teeth of the saw, the finger having automatic four-component motion, (i) into engagement with the saw, (ii) in the indexing direction, (iii) out of engagement with the saw and (iv) back to a starting position ready to re-engage with a succeeding tooth space. It is also preferred to provide that the clamping means is applied at the end of the indexing motion, and to provide a further motion of the finger after the movement (iii) out of engagement with the saw, to a position where it is well clear of the grinding wheel as the latter passes through its operative position.

According to another preferred feature of the invention, the grinding wheel mounting is adapted for rectilinear motion and is capable of angular adjustment about an axis parallel with the direction of motion. It is also preferred to provide for adjusting the mounting from one angular setting to another between successive in-feed strokes of the mounting to permit grinding of the tops of saw teeth which are alternatively inclined to opposite sides of the saw. Adjustable stop means may be provided for presetting the two angular positions of the grinding wheel mounting relatively to its axis.

According to another preferred feature of the invention, the cyclical movements of the clamping means, indexing means, and grinding wheel mounting are controlled by pneumatic or hydraulic ram-and-cylinder devices. It is also preferred that the in-feed of the grinding wheel mounting is controlled by a pneumatic device to which is coupled a hydraulic retarding mechanism, arranged to be operative during the portion of the in-feed motion, when the grinding wheel will actually be in engagement with the workpiece.

Other features of the invention will become apparent from the following description of one form of grinding machine adapted for grinding circular saw blades (particularly saw blades having tungsten carbide or like tipped teeth) which will now be described by way of example only, with reference to the accompanying drawings of which:

Figure 1A:
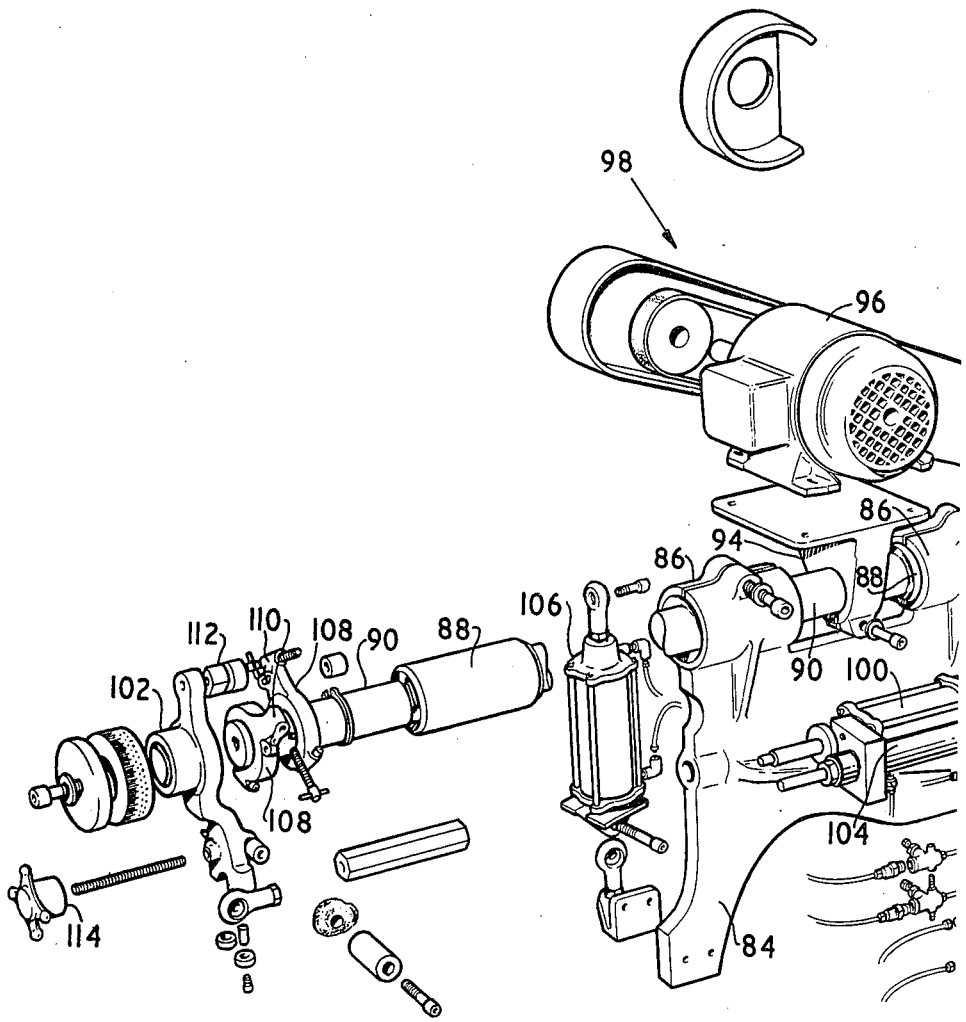
FIG. 1A is a perspective view of one part of the grinding machine in a partially dismantled condition.
Figure 1B:
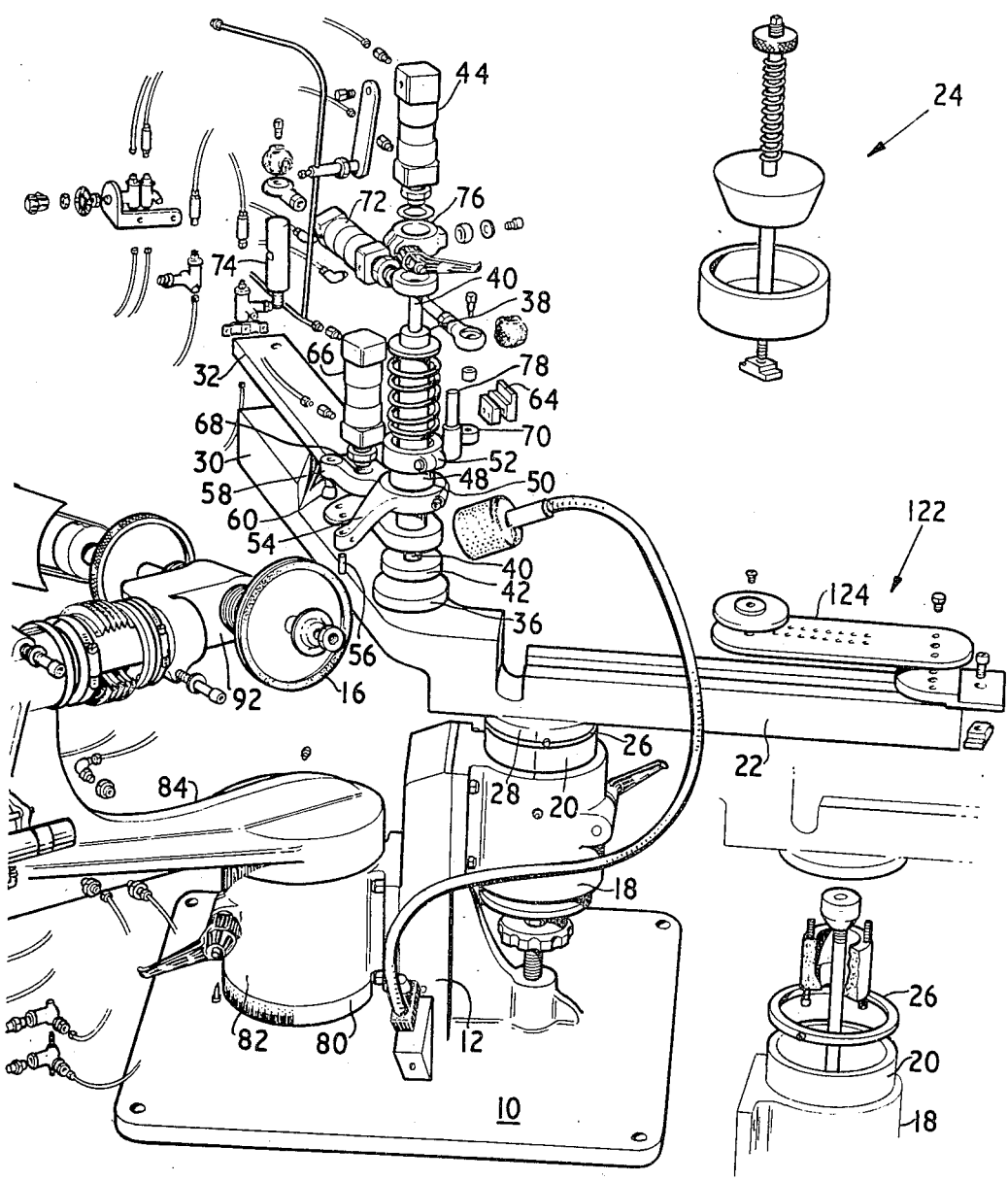
FIG. 1B is a pespective view of the other part of the grinding machine in a partially dismantled condition.
Figure 2:
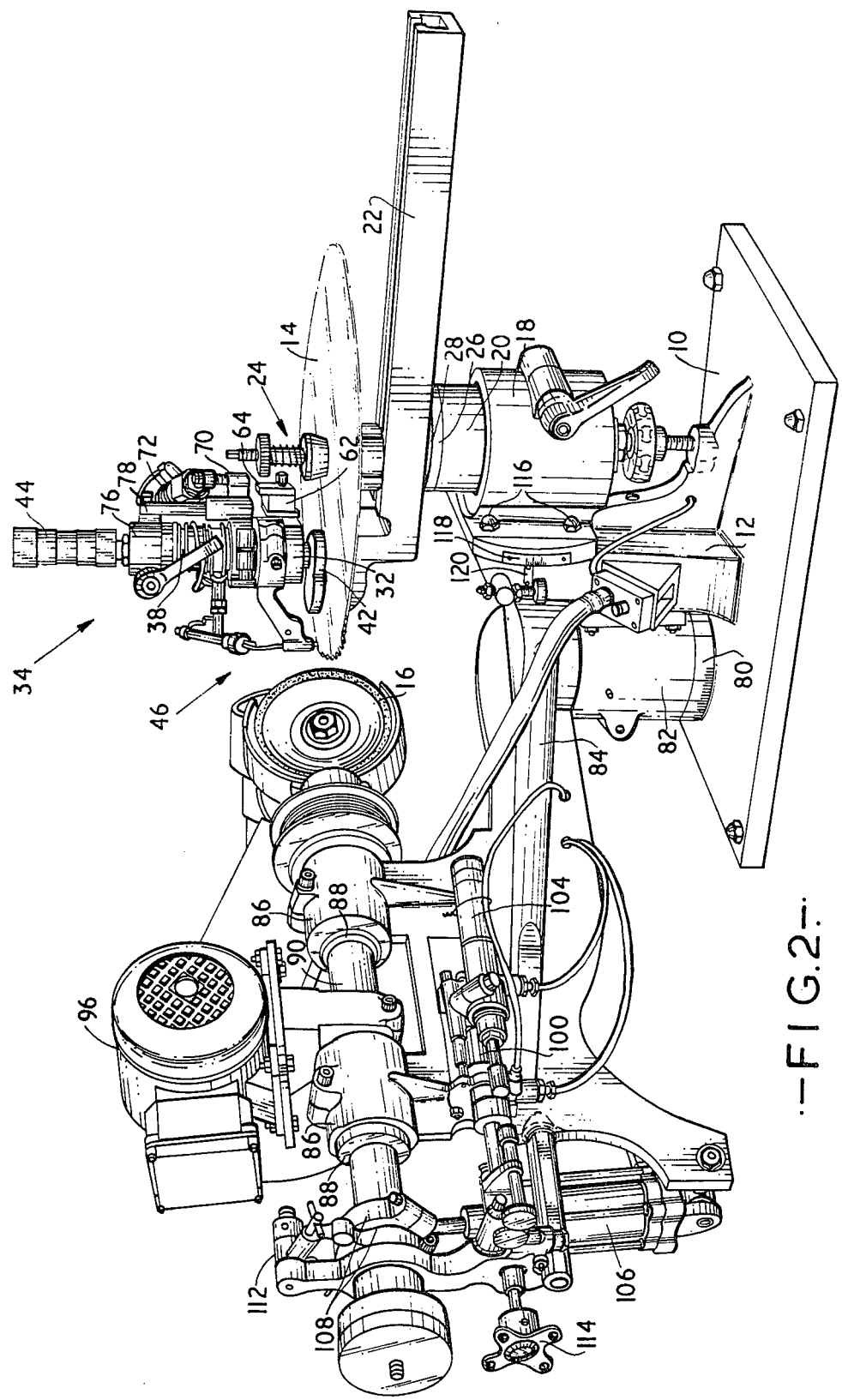
FIG. 2 is a perspective view of the assembled grinding machine with a circular saw blade mounted thereon.

Referring now to the drawings, the grinding machine has a base plate 10 with an upright column 12, on one side of which is adjustably mounted the supporting arrangement for a workpiece, namely a circular saw 14, and on the other side of which is adjustably mounted the supporting arrangement for a grinding wheel 16 adapted to operate on the circular saw 14.

At the workpiece side of the upright column 12 is a bracket 18, within which is a vertically slidable ram 20, capable of being locked in a preselected vertical position. This ram 20 carries a cranked worktable 22, one arm of which is slotted to receive a T-bolt mounting a saw supporting arrangement indicated generally at 24. This arrangement may be similar to that which is described in the specification of our U.S. Pat. No. 3,952,616. In any event, the arrangement has to be such, that the circular saw blade 14 placed thereon, occupies a substantially horizontal position, and the blade 14 is then capable of rotation about its own axis. The upper end of the ram 20 is inclined slightly to the vertical axis of the ram, and a tapered washer 26 is fitted between this oblique upper end of the ram 20, and the underside of a boss 28 on the underside of the cranked worktable 22. Provision is made for relative rotation between the washer 26 and the upper end of the ram 20, in order to provide for a slight tilting of the worktable 22 about a horizontal axis, to provide for relieving the sides of the saw teeth, if such relief is necessary. In one position of the tapered washer 26, the worktable 22 is horizontal, and if the apparatus is used with the washer 26 in that position, then no relief would be formed on the sides of the teeth of the circular saw 14.

The other arm of the worktable 22 is inclined at rather more than a right angle to the first arm, and towards its outer end is formed with an upstanding portion 30, which supports the outer end of a top arm 32, which lies parallel with the second arm of the worktable 22. Hence, the second arm of the worktable 22 can be regarded as being a bifurcated arm, and a clamping arrangement indicated generally at 34 is provided for holding the circular saw 14, on the bifurcated arm, at the position where it joins the first arm of the worktable 22. This clamping arrangement will now be described in some detail.

A disc-like pad 36 is fastened to the worktable 22 at the junction of the two arms, and this pad 36 forms the bottom support for the saw blade 14. A fixed sleeve 38 extends upwardly from the top arm 32 of the bifurcated arm, this sleeve 38 being coaxial with the bottom pad 36, and a rod 40 of a clamping member is slidable vertically within this sleeve 38. At the bottom end of the clamping rod 40 is a disc-like pad 42 which is adapted to engage with the top face of the saw blade 14 placed on the bottom pad 36, so that the blade 14 can be nipped between the two pads 36 and 42. The top end of the clamping rod 40 is secured to the ram of a pneumatic ram-and-cylinder device 44, which is fastened in a vertical position at the top end of the sleeve 38. This ram-and-cylinder device 44 will be hereinafter referred to as the clamping cylinder, and is connected to supply pipes and a pneumatic control system (not shown) which need not be described in detail, in such a manner that the clamping cylinder 44 is double-acting. However, the clamping cylinder 44 is also lightly spring loaded, so that it normally holds the top clamping pad 42 in contact with the support pad 36. Once the saw blade 14 is inserted between the two pads 36 and 42, then the spring pressure will hold the clamping pad 42 in engagement with the top side of the blade 14, but the nipping force exerted between the two pads 36 and 42 is small enough to allow the blade 14 to turn about its axis. However, if air under pressure is admitted to the top end of the clamping cylinder 44, then the top pad 42 is forced downwardly, and the pressure applied to the saw blade 14 is then sufficient to clamp it and prevent its rotation. This clamping force is used to hold the blade 14, whilst a grinding cut is being made. When it is desired to remove the blade 14, air under pressure is supplied by manually operated valve means (not shown) to the opposite end of the double-acting clamping cylinder 44 to lift the top clamping pad 42 to release and allow removal of the blade 14.

The sleeve 38 which supports the clamping cylinder 44 also provides a mounting for an indexing arrangement indicated generally at 46. A linear and rotary bearing 48 is mounted on the exterior of the sleeve 38, above the top clamping pad 42, and two brackets 50 and 52 are clamped on to this bearing 48. The brackets 50 and 52 are angularly adjustable relatively to each other, about the vertical axis of the sleeve 38 and the bearing 48. The lower of these two brackets 50 will be referred to as a finger bracket, because it includes a radial arm 54 which at its outer end carries a vertically depending peg or finger 56, which is adapted to engage in a space between two successive teeth of the saw blade 14 for the purpose of indexing the saw 14 about its axis. This lower bracket 50 also includes a second radial arm 58 angularly displaced relatively to the radial arm 54, and carrying a depending stop 60, which normally occupies a position above the upper arm 32 of the bifurcated arm. A fixed stop member 62 is secured to one side edge of the upper arm 32, and is aligned with the depending stop 60 on the finger bracket 50, so that it arrests the depending stop 60, and therefore arrests the finger bracket 50, when the latter is turning in the forward indexing direction. The fixed stop 62 is in fact stepped, so that if the finger bracket 50 is raised, to allow the depending stop 60 to rise above the bottom step, then the finger bracket 50 can move through another increment in the indexing direction, before it engages with an upper portion 64 of the fixed stop 62. A pneumatic lifting cylinder 66 is fixed in a vertical position to the top side of the arm 58, and its ram projects through a clearance hole 68 in that arm. Consequently, when air is admitted to the upper end of the lifting cylinder 66, the ram is projected, and when it engages with the upper surface of the upper arm 32, this lifts the finger bracket 50, to release the depending stop 60 from the lower step of the fixed stop 62. The purpose of the stepped stop arrangement, and the additional increment of indexing movement, will appear hereinafter.

The upper bracket 52 on the linear and rotary bearing 48 will be referred to as the indexing bracket, and it has a short radial arm 70, to which is pivotally connected the "free" end of a ram projecting from a horizontally disposed pneumatic cylinder 72, the other end of which is pivotally connected to a post 74 upstanding from the outer end of the arm 32. Hence, when air is admitted to the outer end of the indexing cylinder 72, the ram is projected to turn the two brackets 50 and 52 on the vertical sleeve 38, for the purpose of indexing the finger 56 in a forward direction, and when air is admitted to the opposite end of the cylinder 72, the ram is retracted, to move the finger 56 in the reverse direction. The indexing stroke length is governed by the setting of the starting position of the indexing finger 56, and this is determined by a setting bracket 76 angular adjustable about the sleeve 38, and engageable with an upstanding post 78 on the upper of the two rotary brackets 52.

It will be appreciated therefore, that there are three pneumatic cylinders 44, 66 and 72 which control the clamping and indexing of a saw blade. These three cylinders 44, 66 and 72 are all connected to the pneumatic supply system (not shown), which is arranged in known manner, to provide for cyclical operation of the three cylinders. Commencing from the position at which the indexing ram 72 is retracted, so that the indexing finger 56 is in the starting position, the lifting ram 66 is completely retracted, so that the finger 56 is lowered into a space between two successive teeth of the saw blade 14. At this stage, no pressure is applied to the clamping cylinder 44, and hence the saw blade 14 is able to turn. The indexing ram 72 is then operated to turn the indexing finger 56 in the forward direction, and this turns the saw blade 14 until the depending stop 60 engages with the fixed stop 62. At this position, the clamping cylinder 44 is operated to apply a clamping force to the saw blade 14, and then the lifting cylinder 66 is further operated to lift the depending stop 60 away from the bottom step of the fixed stop 62, thus lifting the indexing finger 56 out of engagement with the saw blade 14, and the indexing cylinder 72 is operated to move the indexing finger 56 through the final increment of movement, where it travels to a position well clear of the advancing grinding wheel 16, as the latter passes into engagement with the tooth which is being ground. When the grinding wheel 16 has retracted, the indexing cylinder 72 is operated to retract its ram, and this withdraws the indexing finger 56 to the starting position, which is then aligned with a succeeding space between teeth on the saw blade 14. The clamping pressure is then released, and at the same time the lifting cylinder 66 retracts its ram, so allowing the indexing finger 56 to descend into the succeeding space, ready for the next indexing operation.

Turning now to the other side of the upstanding column 12 on the base 10, a vertical ram 80 in a mounting bracket 82 is adjustable angularly about its vertical axis, and carries the inner end of a grinding wheel mounting arm 84, which extends radially from the ram 80. This arrangement allows the angular position of the grinding wheel mounting arm 84 to be preselected. Towards its outer end, the mounting arm 84 carries a pair of fixed bosses 86, which mount a pair of linear and rotary bearings 88, which are coaxial. A feed spindle 90 extends horizontally through these bearings 88, and at its inner end, carries a bracket 92 which supports the spindle for the grinding wheel 16 itself. Between the two linear and rotary bearings 88, the feed spindle 90 supports a motor bracket 94, on which is fixed a small electric motor 96 for driving the grinding wheel 16, and there is a conventional belt drive indicated generally at 98 between this motor 96 and the grinding wheel spindle. Hence, the grinding wheel 16 can be rotated about its own spindle axis, and if the feed spindle 90 is moved axially, the grinding wheel 16 is moved towards and away from the operative grinding position.

A pneumatic feed ram 100 is fixed to one side of the grinding wheel mounting arm 84, and its ram extends outwardly, parallel with the feed spindle 90. At its outer end, this ram is connected to a feed bracket 102, which is itself fixed to the outer end of the feed spindle 90. Consequently, when the feed ram 100 is retracted, it pulls the feed spindle 90 inwardly, to provide an operative stroke. A hydraulic check ram 104, forming a hydraulic retarding mechanism, is also fixed to the grinding wheel mounting arm 84 and has its ram projecting outwardly, so that it is aligned with part of the feed bracket 102. The arrangement of this ram 104 is such that when the grinding wheel 16 is passing through that portion of its stroke where it is actually carrying out a grinding operation, then the ram 104 is engaged by the feed bracket 102, and this controls the motion of the grinding wheel 16 through this portion of its movement.

Provision is also incorporated in the grinding wheel mounting, for in-feeding the grinding wheel 16 in one of two alternative positions, or alternate in-feed strokes, so that this arrangement can be used where it is necessary to grind the tops of saw teeth, which are raked to alternate sides of the blade.

For this purpose, a pneumatic ram-and-cylinder device 106, which will be hereinafter referred to as the tilting cylinder is fastened to one side of the grinding wheel mounting arm 84, near to its outer end, and the free end of the ram of this tilting cylinder 106 is coupled to one of a pair of tilting brackets 108, which are clamped on to the feed spindle 90. Each of these brackets 108 has an adjustable screw stop 110, which is engageable with a fixed stop 112 on the feed bracket 102 itself.

The weight of the grinding wheel motor and spindle arrangement is offset to one side of the axis of the feed spindle 90, so that normally the grinding wheel 16 will occupy an angular orientation relatively to the saw 14, which is determined by engagement of one of the adjustable stops 110 with the fixed stop 112 on the feed bracket 102. This is a preset position, which is required for grinding the rake on the top of those teeth which have the tops inclined to one side. However, if the tilting ram 106 is operated, to turn the feed spindle 90 about its own longitudinal axis, so as to bring the other stop 110 into engagement with the fixed stop 112 on the feed bracket 102, then the grinding wheel 16 will occupy the alternate orientation relatively to the saw blade 14, so that it is in a position to grind the tops of those teeth which have their tops inclined to the opposite side of the grinding wheel 16.

The feed bracket 102 also provides a mounting for a screw stop 114, which is adapted to engage with a part of the mounting arm 84 itself, to limit the in-feed of the grinding wheel 16.

It will be appreciated that the feed and tilting cylinders 100 and 106 are also controlled by the pneumatic control arrangement (not shown), so that the in-feed of the grinding wheel 16 is synchronised with the clamping and indexing mechanism 34, whereby the grinding wheel 16 only passes through the operative position, when the indexing finger 56 has been moved through the additional increment of movement, so that it is out of the path of movement of the grinding wheel 16, and so that any tilting of the grinding wheel 16 only takes place, when the latter is in a retracted position free from engagement with the saw blade 14.

The control mechanism also includes arrangements whereby it is possible to cancel the operation of the tilting cylinder 106, for use when the grinding wheel 16 is used to grind the front edges of the teeth, or the sides of the teeth, or the tops of the teeth, if the tops are not inclined alternately to opposite sides of the wheel.

It is also possible to rotate the feed spindle 90, to a position where a cup grinding wheel (not shown) can be placed on the machine, and used to grind the sides of the teeth.

In a modification, the arrangement for providing tilting of the worktable about a horizontal axis which includes forming the ram 20 with an oblique upper end and providing a tapered washer 26 to fit thereon is dispensed with and the bracket 18 is pivotally mounted on a horizontal stud (not shown) secured in the column 12. The bracket 18 is clamped to the column by means of four clamping bolts 116 and arcuately slotted holes are provided in the bracket 18 to permit tilting of the bracket 18 relatively to the column 12 about the horizontal axis of the stud. A graduated scale 118 is provided on the bracket 18 and a datum mark 120 is formed on the column 12 so that there is a visual indication in degrees of the angle of tilt of the worktable 22 relatively to the column 12.

In another modification, an alternative saw supporting arrangement indicated generally at 122 is provided which includes an extension arm 124 one end of which is adapted to be connected to the slotted worktable 22 and the other end of which is adapted to have the saw blade 14 mounted thereon. This alternative saw supporting arrangement 122 enables the teeth of either smaller or larger diameter saw blades to be ground on the machine than would be possible if only the saw supporting arrangement 24 was utilised.

I claim:

1. A grinding machine comprising means for supporting a circular saw or the like for rotation about its own axis; cyclically controlled clamping means for successively clamping and releasing said saw mounted on the machine at least in a zone of the saw adjacent to a grinding position, said saw being freely rotatable when released; cyclically controlled indexing means for the saw or the like mounted on the machine; a grinding wheel; a cyclically controlled means mounting said grinding wheel and adapted to move said grinding wheel into and out of said grinding position; and control means arranged to, in sequence, release said clamping means, activate said indexing means to index said saw, engage said clamping means and activate said grinding wheel mounting means to move said grinding wheel through said grinding position.

2. A grinding machine according to claim 1, wherein the indexing means includes a finger adapted to engage in a space between two teeth of the saw and means for providing the finger with automatic four-component motion, (i) from a starting position spaced from said saw into engagement with a tooth space on said saw, (ii) in the indexing direction, (iii) out of engagement with the tooth space on said saw and (iv) back to said starting position ready to re-engage with a succeeding tooth space.

3. A grinding machine according to claim 1, wherein the clamping means is adapted to engage said saw at the end of the indexing motion.

4. A grinding machine according to claim 2, wherein said finger moving means is adapted for further movement of the finger after the movement (iii out of engagement with the tooth space on said saw to a position where it is well clear of the grinding wheel as the latter passes through its grinding position.

5. A grinding machine according to claim 1, wherein the grinding wheel mounting means is adapted for rectilinear motion and is capable of angular adjustment about an axis parallel with the direction of motion.

6. A grinding machine according to claim 1, wherein the grinding wheel mounting means comprises means for adjusting said grinding wheel from one angular setting to another between successive in-feed strokes of the mounting means to permit grinding of the tops of saw teeth which are alternatively inclined to opposite sides of the saw.

7. A grinding machine according to claim 6, wherein adjustable stop means is provided for presetting the two angular positions of the grinding wheel mounting means relatively to its axis.

8. A grinding machine according to claim 1, further comprising pneumatic or hydraulic ram-and cylinder devices for controlling the cyclical movement of the clamping means, indexing means and grinding wheel mounting means.

9. A grinding machine according to claim 8, further comprising a pneumatic device for controlling the in-feed of the grinding wheel mounting means to which is coupled a hydraulic retarding mechanism, arranged to be operative during the operation of the in-feed motion, when the grinding wheel is actually in engagement with the workpiece.

* * * * *